United States Patent [19]

Ishikawa

[11] Patent Number: 5,615,140
[45] Date of Patent: Mar. 25, 1997

[54] FIXED-POINT ARITHMETIC UNIT

[75] Inventor: Toshihiro Ishikawa, Yokohama, Japan

[73] Assignee: Matsushita Electric Industrial Co., Ltd., Osaka, Japan

[21] Appl. No.: 385,121

[22] Filed: Feb. 7, 1995

[30]     Foreign Application Priority Data

Feb. 14, 1994 [JP] Japan ................................. 6-017190
Aug. 24, 1994 [JP] Japan ................................. 6-220806

[51] Int. Cl.⁶ .............................. G06F 7/48; G06F 9/34
[52] U.S. Cl. ................................. 364/749; 395/421.02
[58] Field of Search ...................... 364/749; 395/421.02

[56]             References Cited

U.S. PATENT DOCUMENTS

| | | | |
|---|---|---|---|
| 3,331,056 | 7/1967 | Lethin et al. ........................ | 395/421.02 |
| 5,081,607 | 1/1992 | Bates et al. .............................. | 364/749 |
| 5,189,636 | 2/1993 | Patti et al. .............................. | 364/749 |
| 5,210,839 | 5/1993 | Powell et al. ............................ | 364/749 |
| 5,237,672 | 8/1993 | Ing-Simmons et al. ........... | 395/421.02 |
| 5,390,135 | 2/1995 | Lee et al. ................................ | 364/749 |
| 5,404,474 | 4/1995 | Crook et al. ....................... | 395/421.02 |

FOREIGN PATENT DOCUMENTS 2293928A  12/1990  Japan .

*Primary Examiner*—David H. Malzahn
*Attorney, Agent, or Firm*—Watson Cole Stevens Davis, P.L.L.C.

[57]             ABSTRACT

A fixed-point arithmetic unit has a calculation controller for detecting number of significant bits of data to be calculated and controlling an adder so as to inhibit it from transferring a carry to a portion of the adder unnecessary for calculation of the significant bits and a register controller for controlling a register adapted to store input and output of the adder such that only the significant bits of data are stored in the register, whereby when the significant bits of data is smaller than a bit width of the arithmetic circuit, consumptive power of the arithmetic unit can be reduced.

9 Claims, 6 Drawing Sheets

FIXED-POINT ARITHMETIC UNIT

BACKGROUND OF THE INVENTION

The present invention relates to an arithmetic unit, an address generator and a program controller which are used in a digital signal processor (hereinafter simply referred to as DSP).

In recent years, the DSP has been used frequently in, for example, a digital portable telephone. In the DSP to be built in an apparatus as above, the fixed-point arithmetic is often carried out to suppress consumptive power and costs and in that case, the number of significant digits or bits of data to be used for calculation is sometimes changed in conformity with the required accuracy of calculation for the signal processing.

In a prior art, when the number of significant bits of data used for calculation is smaller than the bit width of an arithmetic circuit, efforts are made to increase the speed of the processing for masking or shifting input/output data, to match it with the bit width of the arithmetic circuit. For example, JP-A-2-293928 discloses a configuration which uses an arithmetic and logic mechanism of variable operational word length.

The prior art will be described hereunder with reference to FIG. 7 showing, in block form, a conventional arithmetic unit of a microcomputer. In the prior art, an operational word length setting circuit 101 sets significant bits of the arithmetic circuit, data correcting circuits 103 and 104 respond to a control signal from the setting circuit to generate calculation data supplied to the arithmetic circuit, an arithmetic and logic circuit 100 of variable operational word length responds to the control signal from the setting circuit and data from the data correcting circuits to perform calculation, a bit accuracy setting circuit 102 controls the significant bits of an output result of the arithmetic circuit, and a bit accuracy correcting circuit 106 responds to a control signal from the setting circuit to correct the significant bits. In the arithmetic unit constructed as above, calculation input data and data of calculation results are masked or shifted to ensure that load on software for matching the arithmetic significant digit can be reduced to improve the processing speed of the whole system.

In the prior art arithmetic unit, however, data having the same bit width as that owned by the arithmetic circuit and being larger than the significant digits of the data is supplied from the data correcting circuit to the arithmetic circuit and besides, the transfer of a carry is not controlled in the arithmetic circuit, raising a problem that even a portion of the arithmetic circuit which is unnecessary for calculation of the significant bits is operated to increase power consumption.

In another example where the DSP is so used as to be built in an apparatus, the number of words installed in a data memory and an instruction memory is often changed to match the number of words used in an application program of the apparatus in which the DSP is built. For example, even when a data address register of a DSP is of 16 bits and accordingly, an address space of $2^{16}$ i.e., 65536 words can be designated to a data memory, a semiconductor chip of the DSP is often installed with a data memory for only 256 words if the capacity of the data memory actually used by programs to be executed is known as being 256 words. Through this, the area of the semiconductor chip can be decreased to reduce the cost. In this case, however, the 256-word address space of the data memory can be designated using 8 bits at the most, raising a problem that the address generator included in the DSP and having the address register of 16-bit width is superfluously operated by 8 bits.

The instruction memory also faces a similar problem. If the number of lines of a program to be executed is 256 words, the capacity of an instruction memory installed is sometimes of only 256 words. When the bit width of a program counter of the DSP is 16 bits, there arises a problem that a program controller included in the DSP having the program counter is superfluously operated by 8 bits.

SUMMARY OF THE INVENTION

The present invention intends to solve the above prior art problems and it is an object of the present invention to provide an arithmetic unit which can reduce power consumable in an arithmetic circuit and input and output registers associated therewith by controlling the arithmetic circuit such that it is operated in conformity with only significant digits or bits of data less than the bit width of the arithmetic circuit and which can improve the calculation speed.

Another object of the present invention is to provide an address generator and a program controller which can decrease the bit width of a maximal address in conformity with a memory and which can reduce power consumable in an arithmetic circuit, an address register and an increment register by controlling the arithmetic circuit to cause it to operate for only significant bits of data less than the bit width of the arithmetic circuit and which can improve the calculation speed.

To accomplish the above object, an arithmetic unit according to the present invention comprises arithmetic means for performing calculation of data, operational word length storing means for storing a significant digit of calculation by the arithmetic means, and control means connected to the operational word length storing means to inhibit the arithmetic means from operating a portion thereof unnecessary for calculation of the significant bits, whereby only the significant bits are allowed to be calculated.

The arithmetic means in the arithmetic unit is an arithmetic and logic circuit and the arithmetic unit comprises first and second registers for storing data to be calculated by the arithmetic and logic circuit, a third register for storing an output of the arithmetic and logic circuit, and a register controller for commanding the first, second and third registers to store only the significant bits.

To accomplish the above object, an address generator according to the present invention comprises an installed address width storage for storing a bit width of a maximal address of a memory adapted to store data, address generator means for supplying an address to the memory, and control means connected to the installed address width storage to inhibit the address generator means from operating for bits other than the bit width of the maximal address, whereby calculation operation for only the bit width of the maximal address is allowed to be executed.

To accomplish the above object, the address generator means of the address generator according to the present invention includes an address register for storing an address designated to the memory, an increment register for storing an increment value which modifies an address of an output of the address register, and an adder for adding the address from the address register and the increment value from the increment register together and delivering an output to the address register, whereby the control means commands the address register and the increment register to store only significant bits and delivers a control signal which inhibits the adder from operating a portion thereof unnecessary for calculation of the significant bits.

To accomplish the above object, a program controller according to the present invention comprises an instruction memory for storing instructions of a processor, an installed address width storage for storing a bit width of a maximal address of the instruction memory, a program counter for applying an address of an instruction to be read out of the instruction memory to the instruction memory, and control means connected to the installed address width storage to inhibit the program counter from operating for bits other than the bit width of the maximal address, whereby calculation operation for only the bit width of the maximal address is allowed to be executed.

To accomplish the above object, the program counter of the program controller according to the present invention includes an address register for storing an address designated to the instruction memory, a constant generator for storing an increment value which modifies an address of an output of the address generator, and an adder for adding the address from the address register and the increment value from the constant generator, whereby the control means commands the address register and the constant generator to store only significant bits and delivers a control signal which inhibits the adder from operating for a portion thereof unnecessary for calculation of the significant bits.

In the arithmetic unit of the present invention constructed as above, the control means transmits a control signal which inhibits the arithmetic means from transferring a carry to a portion (for example, the most significant digit or bit and its upper digits or bits) of the arithmetic means unnecessary for calculation of the significant digits or bits so that the portion of the arithmetic means unnecessary for calculation of the significant digits or bits may not be operated, thereby reducing consumptive power and improving or increasing the processing speed.

Further, in the arithmetic unit of the present invention constructed as above, the calculation controller inhibits the arithmetic and logic circuit from transferring a carry to a portion of the arithmetic and logic circuit unnecessary for calculation of the significant bits so that the portion of the arithmetic and logic circuit unnecessary for calculation of the significant bits may not be operated, the register controller commands the first and second registers for storage of data subject to the calculation processing to store only the significant bits so that values inputted to the arithmetic and logic circuit from bits other than the significant bits may remain unchanged, and the register controller commands the third register for storage of a result of calculation to store only the significant bits, preventing output bits other than the significant bits from being stored in the third register, so that other bits than the significant bits of the calculation result may remain unchanged, thereby reducing consumptive power and improving or increasing the processing speed.

In the address generator of the present invention constructed as above, the control means inhibits the address generator means from operating for bits other than the bit width of the maximal address so that calculation operation for only the bit width of the maximal address may be allowed to be executed, inhibits the transfer of a carry to a portion of the adder unnecessary for calculation of the significant bits when the bit width of the significant bits is smaller than the bit width of the maximal address so that the portion of the adder unnecessary for calculation of the significant bits may not be operated, and commands the address register and the increment register to store only the significant bits to prevent bits other than the significant bits from being inputted to the adder so that the address generator may be prevented from operating for other bits than the significant bits, thereby reducing consumptive power and improving the processing speed.

In the program controller of the present invention constructed as above, the control means inhibits the program counter from operating for bits other than the bit width of the maximal address so that calculation operation for only the bit width of the maximal address may be allowed to be executed, inhibits the transfer of a carry to a portion of the adder unnecessary for calculation of the significant bits when the bit width of the significant bits is smaller than the bit width of the maximal address so that the portion of the adder unnecessary for calculation of the significant bits may not be operated, and commands the address register and the constant generator to store only the significant bits to prevent bits other than the significant bits from being inputted to the adder so that the program counter may be prevented from operating for other bits than the significant bits, thereby reducing consumptive power and improving the processing speed.

DESCRIPTION OF THE PREFERRED EMBODIMENTS

Figure 1:
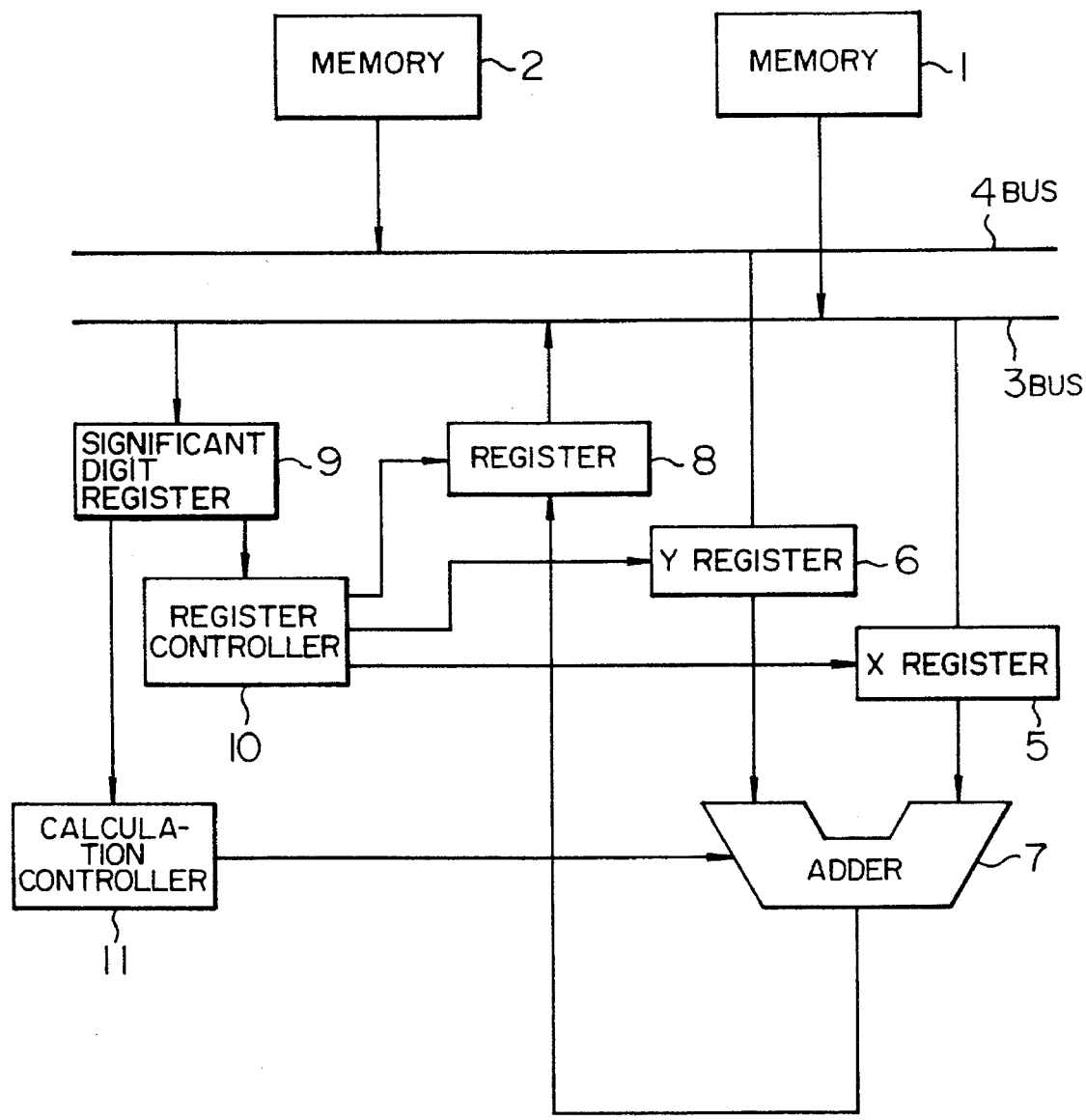
FIG. 1 is a schematic block diagram showing an arithmetic unit according to a first embodiment of the present invention.
Figure 2:
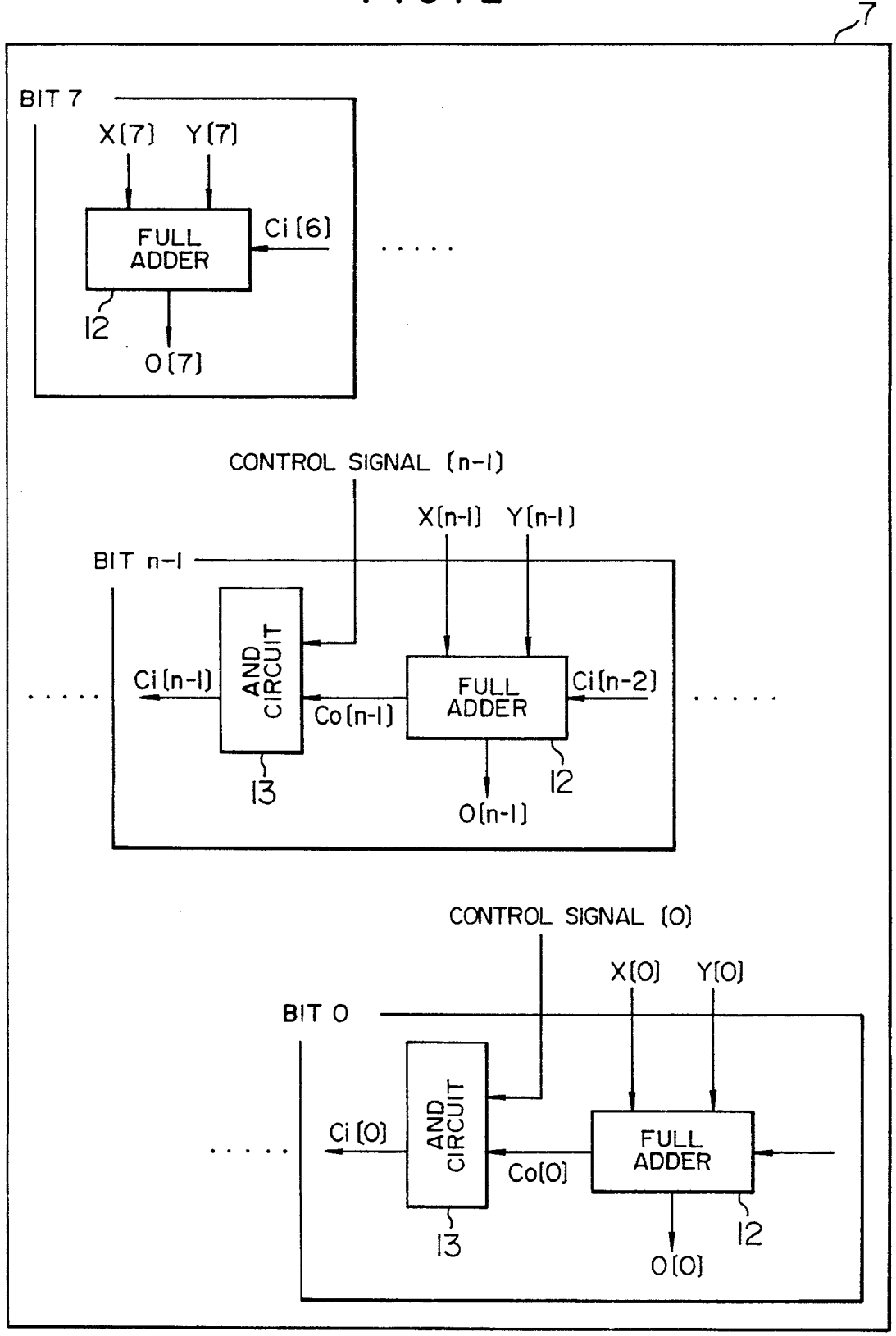
FIG. 2 is a diagram showing details of an example of the construction of an adder shown in FIG. 1

Embodiments of the present invention will now be described in greater detail with reference to FIGS. 1 to 6 in the accompanying drawings. An arithmetic unit according to a first embodiment of the present invention will first be described with reference to FIGS. 1 and 2. FIG. 1 is a schematic block diagram of the arithmetic unit according to the first embodiment of the present invention and FIG. 2 is a diagram showing details of an example of the construction of an adder shown in FIG. 1.

Referring to FIG. 1, memories 1 and 2 (bit 0 to bit n) store data, buses 3 and 4 (bit 0 to bit n) are used to supply the data stored in the memories 1 and 2, and X and Y registers 5 and 6 (first and second registers) store data X and data Y supplied through the buses 3 and 4, respectively. An adder 7 (arithmetic means or arithmetic and logic circuit) adds the data X supplied from the X register 5 and the data Y supplied from the Y register 6 together, a register 8 (third register) stores a result of calculation by the adder 7, and a significant digit storing register 9 (operational word length storage) stores the number of significant bits of data used for calculation.

When the value designated by the significant digit storing register 9 is n, a register controller 10 commands the registers 5, 6 and 8 to store only n bits of from bit 0 to bit n−1. A calculation controller 11 (control means) generates a control signal [0], . . . , or [n−1] which controls delivery of a bit next to each carry that is caused by addition at each bit of data in the adder 7 if carry operation occurs, as will be described hereinafter, and when the value designated by the significant digit storing register 9 is n, the calculation controller 11 commands the adder 7 to inhibit the transfer of a carry from bit n−1 to bit n corresponding to the control signal [n−1]. In the present embodiment, the memories 1 and 2 and buses 3 and 4 are each assumed to have a bit width of 8 bits and n=7 stands.

Before describing the operation of the arithmetic unit of the first embodiment shown in FIG. 1, details of the construction of the adder 7 (arithmetic means) shown in FIG. 1 will be described with reference to FIG. 2 which depicts, in block form, an example of the construction of the adder 7 used in the present embodiment.

In FIG. 2, n units of full adders 12 each of which adds together, bit by bit, data bits X[0], . . . , X[n−1] and X[n] representative of bit 0 to bit n of data X received from the X register 5 and data bits Y[0], . . . , Y[n−1] and Y[n] representative of bit 0 to bit n of Y data received from the Y register 6 and delivers, at respective bits, addition results (sum) O[0], . . . , O[n−1] and O[n] and carries Co[0], . . . , Co[n−1] if carry operation occurs, where a full adder 12 associated with bit n does not deliver any carry, and AND circuits 13 receive, at one input, carries Co[0], . . . , Co[n−1] from the full adders 12 associated with the respective bits and, at the other input, control signals [0], . . . , [n−1] corresponding to the individual carries so as to make a logical product of the carries and the control signals and transfer carries Ci[0], . . . , Ci[n−1] to the respective succeeding stages of full adders 12.

As described above, in the present embodiment, data is of 8 bits (0 to 7) and therefore, 8 full adders 12 associated with bits 0 to 7, respectively, are used. Accordingly, n=7 and n−1=6 stand and the individual full adders 12 receive data bits X[0] to X[7] and Y[0] to Y[7] and control signals [0] to [6], and deliver outputs O[0] to O[7] and carries Co[0] to Co[6], respectively. The AND circuits deliver carries Ci[0] to Ci[6], respectively.

As will be seen from the above explanation, when the transfer of only a carrier from bit n−1 to bit n is desired to be inhibited, only a control signal [n−1] for bit n−1, of the control signals from the calculation controller 11, is rendered to be "0" and control signals for the other bits [0] to [n−2] are rendered to be "1", thereby inhibiting a carry Ci[n−1] from bit n−1 to bit n from being transferred.

Reference is made again to FIGS. 1 and 2. The arithmetic unit constructed as above operates to perform addition of data X having significant bits of m bits which are 4 bits (bit 0 to bit 3) and data Y also having significant bits of m bits which are 4 bits as will be described below. The X register 5, Y register 6 and register 8 are reset to "0" in advance.

Referring to FIG. 1, a value of 4 representing the number of bits of the significant bits (m bits) of data is first stored in the significant digit storing register 9. A value of data X and a value of data Y are then read out of the memories 1 and 2, respectively, and stored in the X register 5 and Y register 6 through the buses 3 and 4. At that time, the register controller 10 commands the X and Y registers 5 and 6 to store only lower four bits, with the result that "0" at upper four bits of each of the X and Y registers 5 and 6 remains unchanged and the data X or data Y is stored at the lower four bits. The adder 7 performs addition of the data X stored in the X register 5 and the data Y stored in the Y register 6.

In this addition, since the calculation controller 11 delivers control signals [0] to [3] of which only a control signal for bit 3 is "0" and control signals for the other bits 0 to 2 are "1", one of the full adders 12 shown in FIG. 2 which is associated with bit 3 is inhibited from transferring a carry Ci[3] to a full adder associated with bit 4. Inputs from the X and Y registers 5 and 6 to four full adders associated with bits 4 to 7 are all fixed to "0", preventing these full adders from operating and therefore, only four full adders associated with bits 0 to 3 are allowed to operate for calculation. Responsive to the control signal from the register controller 10, the register 8 stores only lower four bits of an output of the adder 7. Through the above operation, addition of four significant bits is carried out.

As described above, according to the present embodiment, the register controller 10 commands the X and Y registers 5 and 6 to store only significant bits so that values applied from bits other than the significant bits to the adder 7 may remain to be "0", the calculation controller 11 inhibits the adder 7 from transferring a carry to a portion of the adder unnecessary for calculation of the significant bits so that a full adder associated with the portion unnecessary for calculation of the significant bits may not be allowed to operate, and the register controller 10 commands the register 8 to store only the significant bits of a result of calculation and other bits than the significant bits of the calculation result remain to be "0" so that consumptive power may be reduced when the significant bits of data is smaller than the bit width of the adder 7.

For a better understanding of the present invention, the foregoing embodiment has been described by way of a simplified system but even in an arithmetic and logic circuit employing a high speed carry mechanism (for example, carry-look-ahead circuit), similar effects can be obtained by controlling the carry transfer and input/output registers (X and Y registers 5 and 6 and register 8) in a manner described hereinbefore.

In the foregoing embodiment, the registers (X and Y registers 5, 6 and register 8) are described as being reset to "0" in advance but values other than "0" may be held. Further, the calculation controller 11 in the foregoing embodiment is described as delivering the control signal in which bit n−1 alone is made to be "0" so as to inhibit the adder 7 from transferring a carry from bit n−1 to bit n but a control signal in which values of bit n or larger are made to be "0" may be employed to inhibit the adder 7 from transferring a carry in association with bit n or larger.

Figure 3:
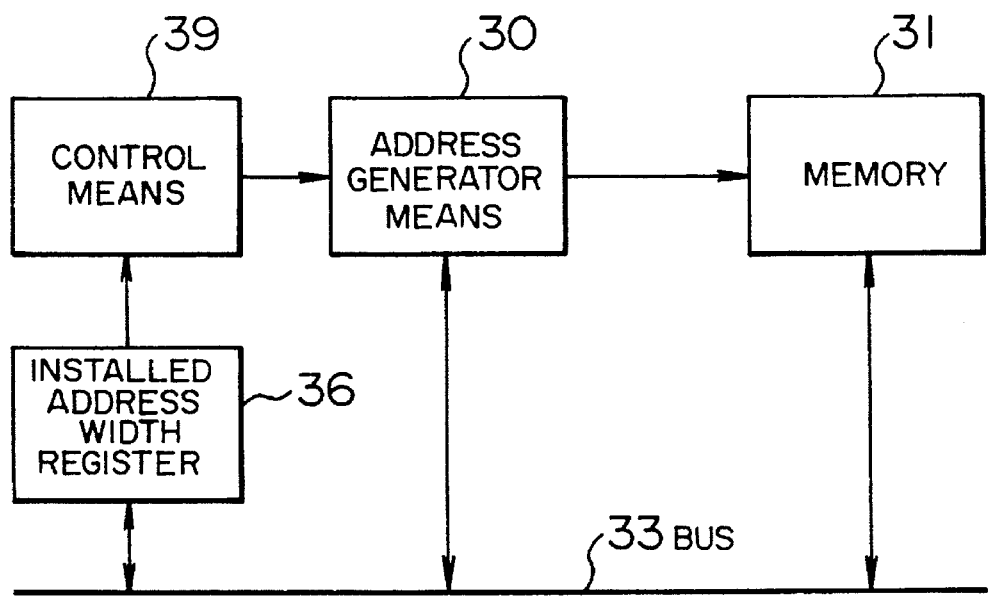
FIG. 3 is a schematic block diagram showing an address generator according to a second embodiment of the present invention.
Figure 4:
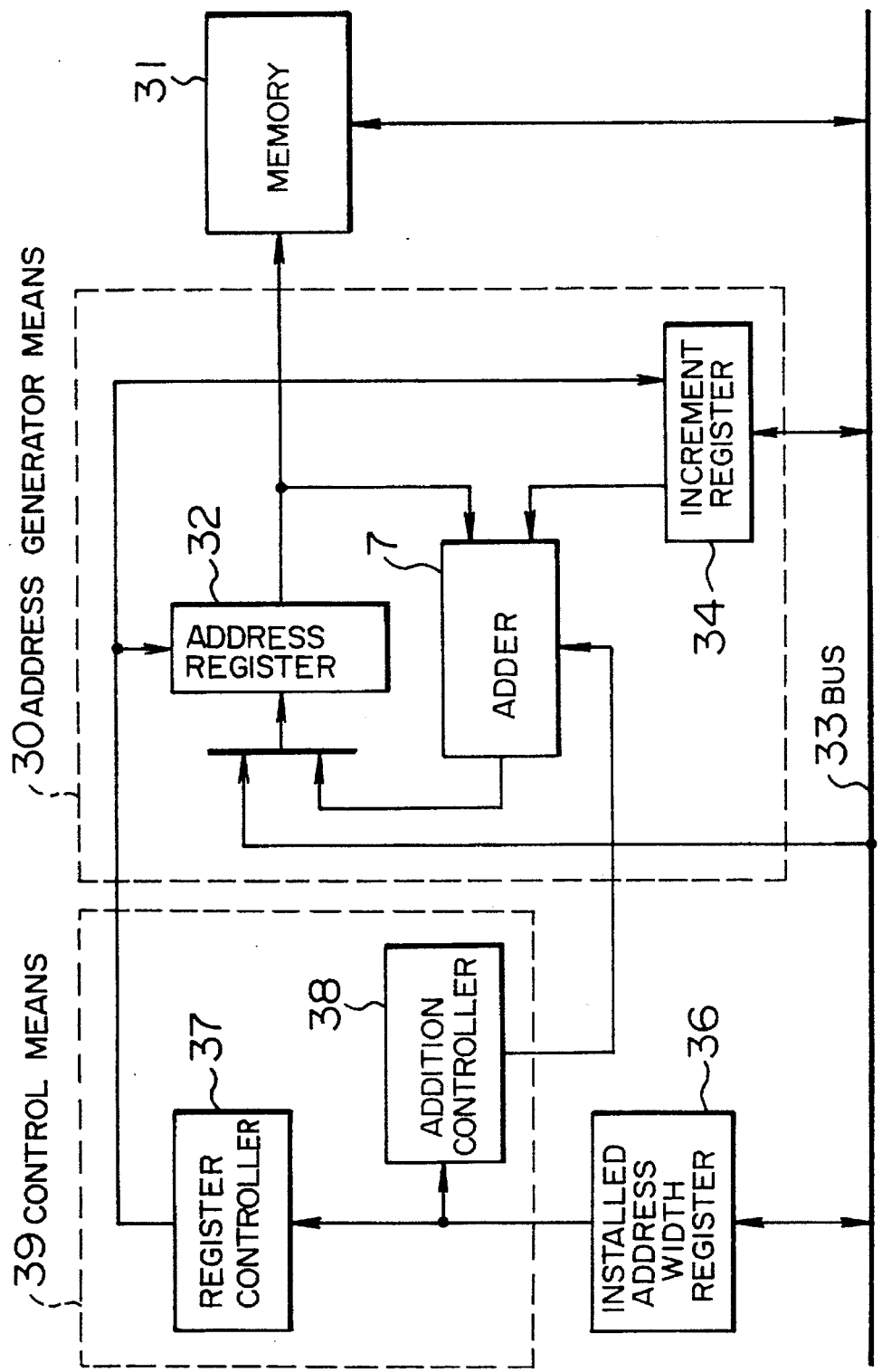
FIG. 4 is block diagram of the address generator according to the second embodiment, showing an example of the internal construction of an address generator means and a control means which are shown in FIG. 3.

Referring now to FIGS. 3 and 4, an address generator according to a second embodiment of the present invention will now be described in detail. The address generator according to the second embodiment of the present invention is shown, in schematic block form, in FIG. 3.

In FIG. 3, a memory 31 stores data and an address generator means 30 designates an address for read/write of data from/in the memory 31. A bus 33 is coupled to the memory 31 and address generator means 30, an installed address width register 36 serves as an installed address width storage which stores a bit width of a maximal address in an address area installed in the memory 31, and a control means 39 commands the address generator means 30 to inhibit it from operating for bits other than the bit width of the maximal address.

Before describing the operation of the second embodiment, details of the internal construction of the address generator means 30 and control means 39 shown in FIG. 3 will be described with reference to FIG. 4. An example of the internal construction of the address generator means 30 and control means 39 included in the address generator according to the second embodiment is shown, in block form, in FIG. 4.

Referring to FIG. 4, an address register 32 stores an address designated to the memory 31. An increment register 34 stores an increment value which modifies an address of an output of the address register 32. An adder 7 adds outputs of the address register 32 and increment register 34 together to deliver an output to the address register 32 and consequently, the address register 32 is written with either a value (new setting value) on the bus 33 or the output of adder 7 (value incremented as a result of addition) so that the value of the address register may be updated.

When the value designated to the installed address width register 36 is n, a register controller 37 commands the address register 32 and increment register 34 to store only n bits of from bit 0 to bit n−1. When the value designated to the installed address width register 36 being n, an addition controller 38 commands the adder 7 to inhibit it from transferring a carry from bit n−1 to bit n.

The example of the adder 7 in the first embodiment described previously with reference to FIG. 2 can also used as an example of the adder 7 in the second embodiment. Accordingly, the construction of the adder 7 shown in FIG. 2 will be described again in brief. More particularly, the AND circuits 13, seven in total, are inserted in signal lines each adapted to transfer a carry between adjacent ones of eight full adders 12 and are applied at one input with 7 bits of the control signals [0], . . . , [6] from the addition controller 38, respectively. By setting the control signals such that only a control signal for bit n−1 (bit 6 in the present embodiment) is "0" but control signals for the remaining bits are "1", the transfer of a carry from bit 6 or bit n−1 to bit 7 or bit n can be inhibited.

In the present embodiment, the bit width of the memory 31 and bus 33 is assumed to be 8 bits. The address area packaged in the memory 31 is assumed to have a size of 16 words from 0 address to f address.

The address generator constructed as above operates when addresses are generated sequentially by decrementing the address by −1 from f address, as will be described below with reference to FIGS. 3 and 4. It is assumed that the address register 32 and increment register 34 are reset in advance to "0".

In the present embodiment, on the assumption that the number of bits of a significant digit of an address is 4 (bits 0 to 3), a value of 4 representative of the bit number of the significant digits or bits of an address is first stored in the installed address width register 36. A value of −1 is stored in the increment register 34 through the bus 33. At that time, since the register controller 37 commands the increment register 34 to store only lower four bits, the upper four bits of the increment register 34 remain to be "0" and a value f representing the −1 value in terms of 2's complements of 4 bits is stored in the lower four bits. Then, a value f of a head address of a generated address is stored in the address register 32 through the bus 33. At that time, since the register controller 37 commands the address register 32 to store only the lower four bits, the upper four bits of the address register 32 remain to be "0" and the value f of the address is stored in the lower four bits. The address value f is supplied to the memory 31.

Next, the adder 7 adds outputs of the address register 32 and increment register 34 together. In this addition, the addition controller 38 delivers control signals [0], . . . , [3] in which only a control signal for bit 3 is "0" and control signals for the other bits are "1", with the result that the transfer of a carry from one of the full adders 12 shown in FIG. 2 that is associated with bit 3 to a full adder 12 associated with bit 4 is inhibited. The inputs of four full adders 12 associated with bit 4 to bit 7 are all fixed to "0" by means of the address register 32 and increment register 34 and therefore, only four full adders 12 associated with bit 0 to bit 3 are allowed to operate for addition. Responsive to the control signal from the register controller 37, the address register 32 stores only the lower four bits of the output of the adder 7. By repeating the above operation, 4-bit address values e, d, c, b, a, 9, 8 are sequentially supplied to the memory 31.

As described above, according to the present embodiment, the register controller 37 commands the address register 32 and increment register 34 to store only the bit width of the maximal address installed in the memory 31 so that values inputted from bits other than the bit width of the maximal address to the adder 7 may remain to be "0", the addition controller 38 inhibits the adder 7 from transferring a carry to a portion of the adder unnecessary for addition of the bit width of the maximal address so that part of the full adders 12 which is not necessary for addition of the bit width of the maximal address may not be operated, and the register controller 37 commands the address register 32 to store only the significant bits and bits other than the bit width of the maximal address remain to be "0" so that consumptive power can be reduced when the bit width of the maximal address installed in the memory 31 is smaller than the bit width of the adder 7.

Further, since the transfer of a carry to an upper digit is inhibited in the adder 7, the time required for addition can be reduced and the machine cycle of the whole DSP can be shortened to permit high-speed operation.

Next, a program controller according to a third embodiment of the present invention will be described in detail with reference to FIGS. 5 and 6. The program controller according the third embodiment of the present invention is depicted, in schematic block form, in FIG. 5.

Figure 5:
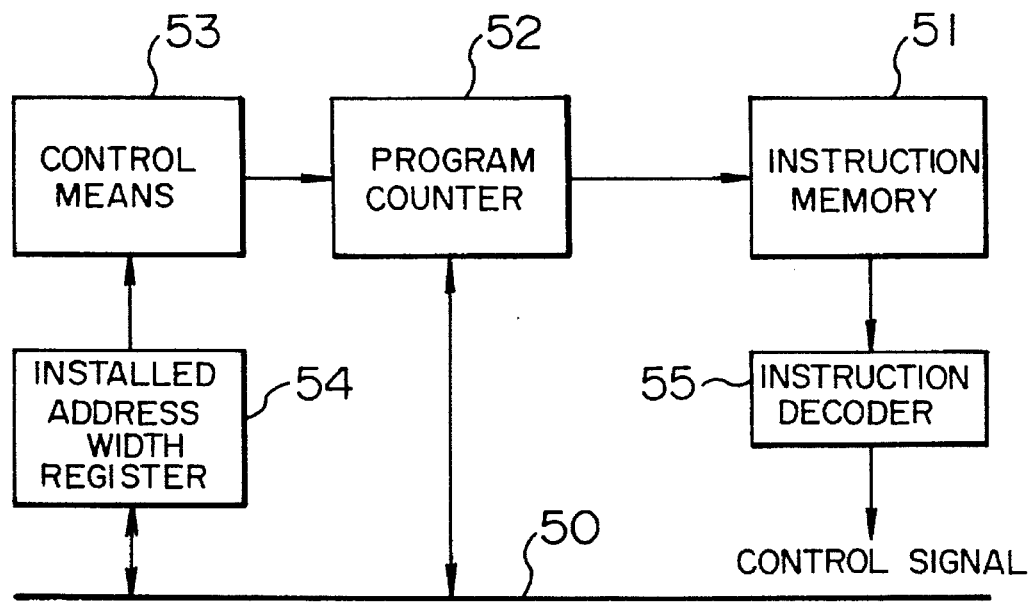
FIG. 5 is a schematic block diagram showing a program controller according to a third embodiment of the present invention.

Referring to FIG. 5, an instruction memory 51 stores instruction codes and a program counter 52 designates to the instruction memory 51 an address of an instruction code to be read. A bus 50 is coupled to the program counter 52, an installed address width register 54 serves as an installed address width storage which stores a bit width of a maximal address in an address area installed in the instruction memory 51, a control means 53 commands the program counter 52 to inhibit it from operating for bits other than the bit width of the maximal address, and an instruction decoder 55 decodes an instruction code delivered out of the instruction memory 51 to deliver a control signal.

Before describing the operation of the third embodiment, details of the internal construction of the program counter 52 and control means 53 shown in FIG. 5 will first be described with reference to FIG. 6. An example of the internal construction of the program counter 52 and control means 53 included in the program controller according to the third embodiment is shown, in block form, in FIG. 6.

Figure 6:
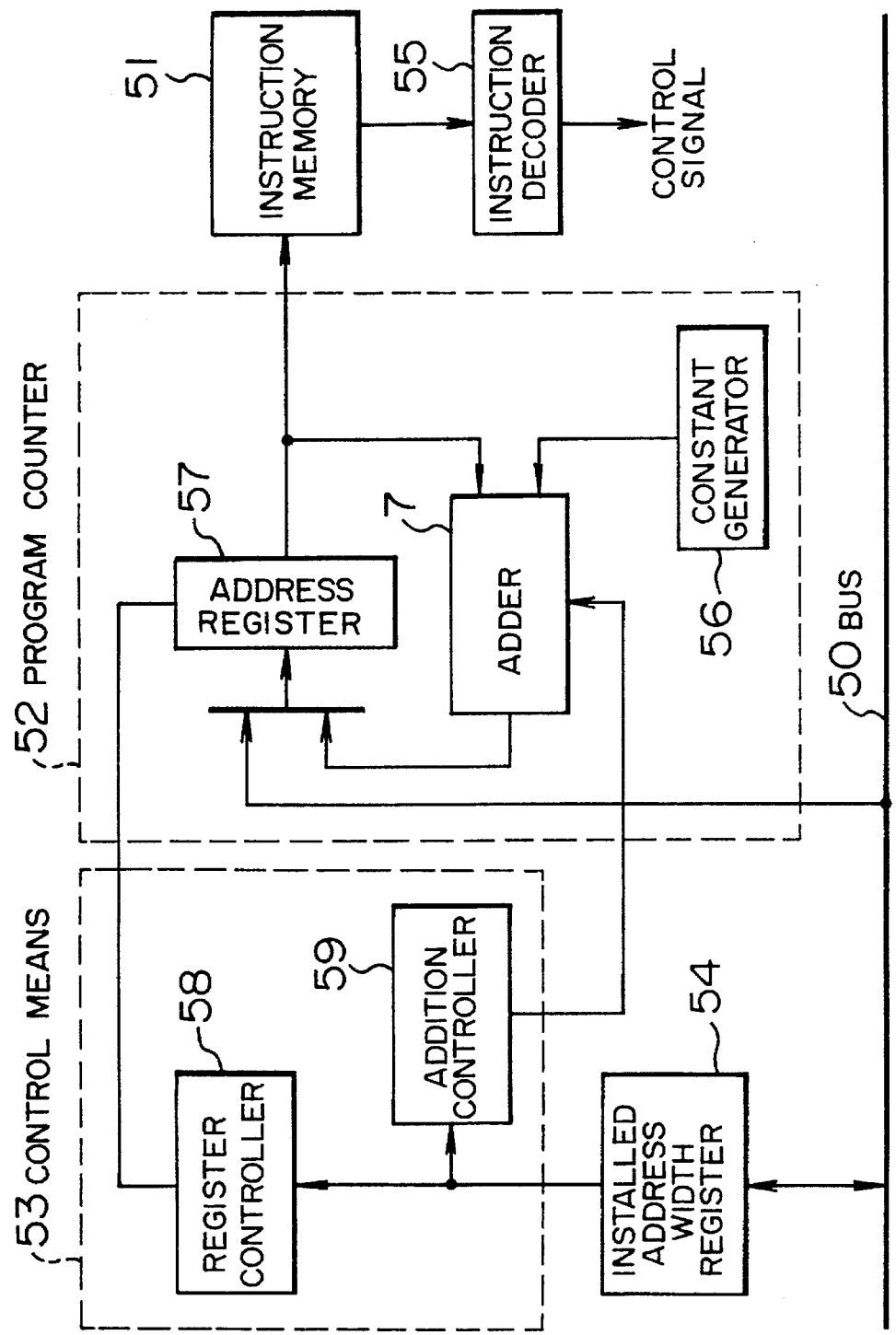
FIG. 6 is a block diagram of the program controller according to the third embodiment, showing an example of the internal construction of a program counter and a control means which are shown in FIG. 5.
Figure 7:
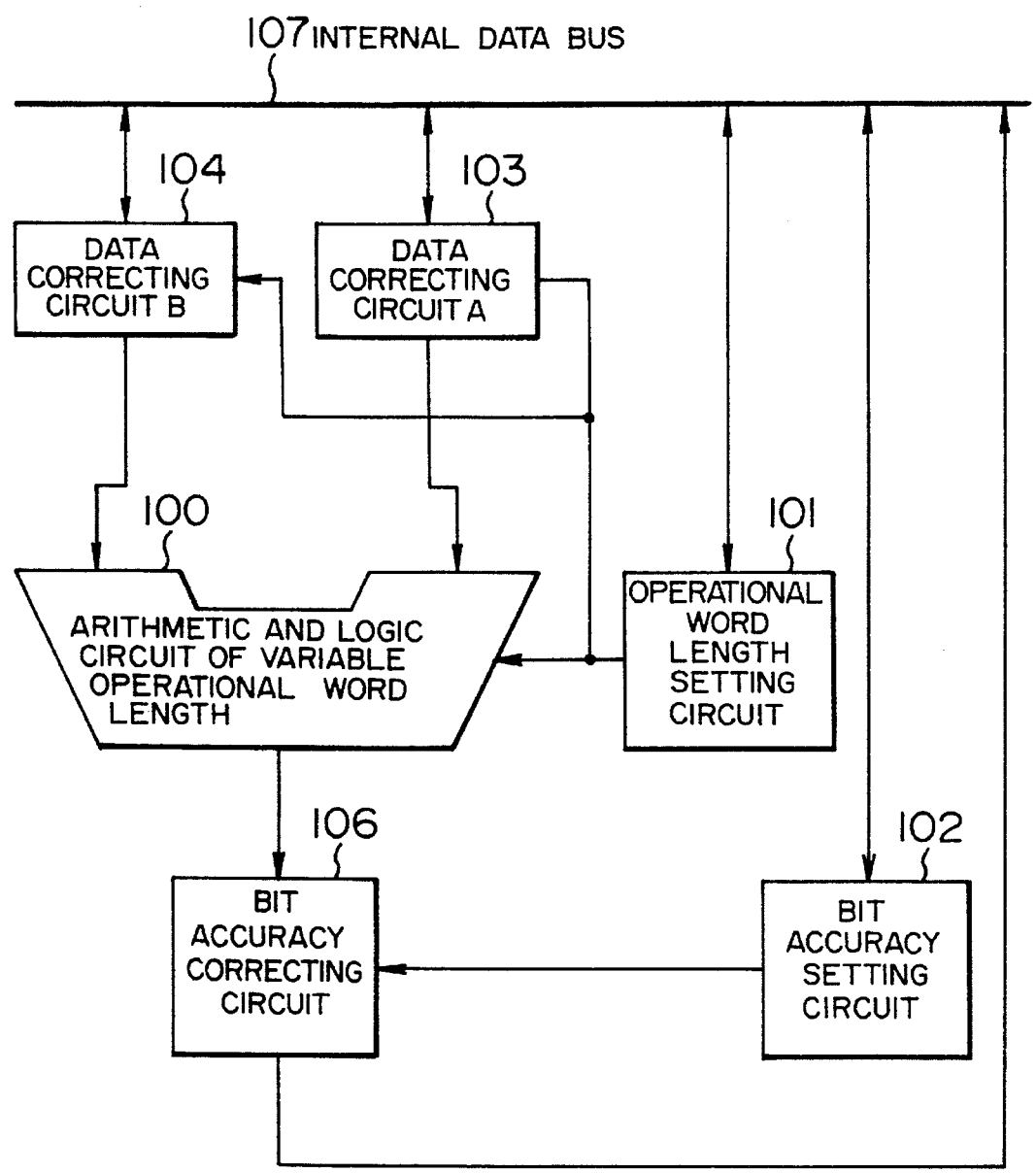
FIG. 7 is a block diagram of a conventional arithmetic unit of a microcomputer.

Referring to FIG. 6, an address register 57 stores an address designated to the instruction memory 51, a constant generator 56 generates and delivers an increment value 1 which modifies an address of an output of the address register 57, and an adder 7 adds outputs of the address register 57 and constant generator 56 together to deliver an output to the address register 57, thus functioning similarly to the adder described previously.

The address register 57 is written with either a value (new setting value) on the bus 50 or the output (sum value) of the adder 5 in order for the value of the register 57 to be updated. When the value designated to the register 54 is n, a register controller 58 commands the address register 57 to store only n bits of from bit 0 to bit n−1. When the value designated to the register 54 is n, an addition controller 59 commands the adder 7 to inhibit the transfer of a carry from bit n−1 to bit n.

The example of the adder 7 in the first and second embodiments described previously with reference to FIG. 2 can also be used as an example of the adder 7 in the third embodiment. Accordingly, to again describe the construction of the adder 7 shown in FIG. 2 in brief, the AND circuits 13, seven in total, are inserted in signal lines each adapted to transfer a carry between adjacent ones of eight full adders 12 and are applied at one input with seven bits of the control signals [0], . . . , [6] from the addition controller 59, respectively. By setting the control signals such that only a control signal for bit n−1 (bit 6 in the present embodiment) is "0" but control signals for the remaining bits are "1", the transfer of a carry from bit 6 or n−1 to bit 7 or n can be inhibited.

In the present embodiment, the bit width of the bus 50 and address register 57 is assumed to be 8 bits. The address area installed in the instruction memory 51 is assumed to have a size of 16 words of from 0 address to f address.

The program controller constructed as above operates when addresses are generated sequentially by incrementing the address by +1 from 0 address, as will be described below with reference to FIGS. 5 and 6. It is assumed that the address register 57 is reset in advance to "0".

In the present embodiment, on the assumption that the number of bits of a significant digit of an address is 4 (bits 0 to 3), a value of 4 representative of the bit number of the significant digit of an address is first stored in the installed address width register 54. Since the address register 57 is reset to "0" in advance, a value 0 of a head address is supplied to the instruction memory 51.

Next, the adder 7 adds outputs of the address register 57 and constant generator 56 together. In this addition, the addition controller 59 delivers control signals [0], . . . , [3] in which only a control signal for bit 3 is "0" and control signals for the other bits are "1", with the result that the transfer of a carry from one of the full adders 12 shown in FIG. 2 which is associated with bit 3 to a full adder 12 associated with bit 4 is inhibited. The inputs of four full adders 12 associated with bit 4 to bit 7 are all fixed to "0" and therefore, only four full adders 12 associated with bit 0 to bit 3 are allowed to operate for addition. Responsive to the control signal from the register controller 58, the address register 57 stores only lower four bits of the output of the adder 7. By repeating the above operation, 4-bit address values 0, 1, 2, 3, . . . are sequentially supplied to the instruction memory 51.

As described above, according to the present embodiment, the register controller 58 commands the address register 57 to store only the bit width of the maximal address installed in the instruction memory 51 so that values inputted from bits other than the bit width of the maximal address to the adder 7 may remain to be "0", the addition controller 59 inhibits the adder 7 from transferring a carry to a portion of the adder unnecessary for addition of the bit width of the maximal address so that part of the full adders 12 which is not necessary for addition of the bit width of the maximal address may not be operated, and the register controller 58 commands the address register 57 to store only the significant bits and other bits than the bit width of the maximal address remain to be "0" so that consumptive power can be reduced when the bit width of the maximal address installed in the instruction memory 51 is smaller than the bit width of the program counter 52 i.e., the bit width of the address register 57.

For a better understanding of the present embodiment, the foregoing embodiment has been described by way of a simplified system but even in a program controller having a stack memory for holding a return address used during program branching, similar effects can be obtained by controlling the carry transfer and various registers in a manner described hereinbefore.

In the arithmetic unit of the invention constructed as described so far, the control means transmits to the arithmetic means a control signal which inhibits the arithmetic means from transferring a carry to a portion of the arithmetic means unnecessary for calculation of significant bits to prevent the portion of the arithmetic means unnecessary for calculation of the significant bits from operating, thereby ensuring that consumptive power can be reduced and the processing speed can be improved.

Further, in the arithmetic unit of the invention constructed as described so far, the calculation controller inhibits the adder from transferring a carry to a portion of the adder unnecessary for calculation of significant bits to prevent the portion of the adder unnecessary for calculation of the significant bits from operating, the register controller commands the first and second registers for storage of data subject to the calculation processing to store only the significant bits so that values of other bits than the significant bits which are inputted to the arithmetic and logic circuit may remain unchanged, and the register controller commands the third register for storage of a result of calculation to store only significant bits so that output bits other than the significant bits may not be stored in the third register and bits of the calculation result other than the significant bits may remain unchanged, thereby ensuring that consumptive power can further be reduced and the processing speed can further be improved.

In the address generator of the invention constructed as described so far, the control means inhibits the address generator means from operating for bits other than a bit width of a maximal address so that calculation operation may be executed for only the bit width of the maximal address and when the bit width of significant digits or bits is smaller than that of the maximal address, the address generator means is prevented from operating for other bits than the significant bits, thereby ensuring that consumptive power can be reduced and the processing speed can be improved.

In the program controller of the invention constructed as described so far, the control means inhibits the program counter from operating for bits other than a bit width of a maximal address so that calculation operation may be executed for only the bit width of the maximal address and when the bit width of significant digits or bits is smaller than that of the maximal address, the program counter is prevented from operating for other bits than the significant bits, thereby ensuring that consumptive power can be reduced and the processing speed can be improved.

Accordingly, as described above, the arithmetic unit, the address generator and the program controller according to the present invention can reduce consumptive power, can improve the processing speed and can promote economical benefits and convenience of use of apparatus.

I claim:

1. An arithmetic unit comprising:
   arithmetic means, comprising an arithmetic and logic circuit, for performing an operation on data;
   operational word length storing means for storing information expressing a number of significant bits of said data to be operated on by said arithmetic means;
   control means, connected to said operational word length storing means, for inhibiting said arithmetic means from operating a portion of said arithmetic means which is unnecessary for said operation on the data within said number of significant bits, whereby only the significant bits are allowed to be operated on;
   first and second registers for storing said data to be operated on by said arithmetic and logic circuit;
   a third register for storing an output of said arithmetic and logic circuit; and
   a register controller, connected to said operational word length storing means, for commanding said first, second and third registers to store only numbers of bits equal to the number of significant bits;
   wherein said arithmetic and logic circuit has a plurality of bit stages and includes at each bit stage (i) a full adder having a carry output and (ii) a gate circuit for controlling a transfer of the carry output of said full adder to an upper bit stage under control of said control means.

2. An arithmetic unit according to claim 1, wherein said gate circuit at each of said plurality of bit stages comprises an AND gate.

3. An arithmetic unit comprising:
   arithmetic means, comprising an arithmetic and logic circuit, for performing an operation on data;
   operational word length storing means for storing information expressing a number of significant bits of said data to operated on by said arithmetic means, said number being smaller than a bit width of said arithmetic and logic circuit;
   control means, connected to said operational word length storing means, for inhibiting said arithmetic means from operating a portion of said arithmetic means which is unnecessary for said operation on the data within said number of significant bits, whereby only the significant bits are allowed to be operated on;
   first and second registers for storing said data to be operated on by said arithmetic and logic circuit;
   a third register for storing an output of said arithmetic and logic circuit; and
   a register controller connected to said operational word length storing means to command said first, second and third registers to store only numbers of bits equal to the number of significant bits so that said first and second registers store least significant bits corresponding to said number of significant bits, and values of bits other than said least significant bits are held at zero.

4. An address generator comprising:
   an installed address width storage for storing a bit width of a maximal address of a memory adapted to store data;
   address generator means for supplying an address to said memory; and
   control means, connected to said installed address width storage, for inhibiting said address generator mean from operating a portion of said address generator means for bits other than the bit width of the maximal address,
   wherein a calculation operation for only the bit width of the maximal address is allowed to be executed,
   wherein said address generator means includes:
      an address register for storing said address;
      an increment register for storing an increment value which modifies the address stored in said address register; and
      an adder for adding the address from said address register and the increment value from said increment register together to obtain an added result and delivering the added result to said address register,
   wherein said control means commands said address register and said increment register to store only significant bits corresponding to said bit width of said maximal address and delivers a control signal which inhibits said adder from operating a portion of said adder which is unnecessary for calculation of the significant bits; and
   wherein said adder has a plurality of bit stages and includes at each bit stage (i) a full adder having a carry output and (ii) a gate circuit for controlling a transfer of the carry output of said full adder to an upper bit stage under control of said control.

5. An address generator according to claim 4, wherein said gate circuit at each of said plurality of bit stages comprises an AND gate.

6. An address generator comprising:
   an installed address width storage for storing a bit width of a maximal address of a memory adapted to store data;
   address generator means for supplying an address to said memory; and
   control means, connected to said installed address width storage, for inhibiting said address generator means from operating a portion of said address generator means for bits other than the bit width of the maximal address,
   wherein a calculation operation for only the bit width of the maximal address is allowed to be executed;
   wherein said address generator means includes:
      an address register for storing said address;
      an increment register for storing an increment value which modifies said address stored in said address register; and
      an adder for adding the address from said address register and the increment value from said increment register together to obtain an added result and delivering the added result to said address register,
   wherein said control means commands said address register and said increment register to store significant bits corresponding to said bit width of the maximal address so that said address register and said constant generator store least significant bits corresponding to said significant bits, and values of bits other than said least significant bits are held at zero, said control means delivering a control signal which inhibits said adder from operating a portion thereof unnecessary for calculation of the significant bits.

7. A program controller comprising:

an instruction memory for storing instructions for a processor;

an installed address width storage for storing a bit width of a maximal address of said instruction memory;

a program counter for supplying to said instruction memory an address of an instruction to be read out of said instruction memory; and control means, connected to said installed address width storage, for inhibiting said program counter from operating a portion of said program counter for bits other than the bit width of the maximal address, wherein a calculation operation only on bits within the bit width of the maximal address is allowed to be executed;

wherein said program counter includes:
an address register for storing said address;
a constant generator for storing an increment value which modifies said address stored in said address register; and
an adder for adding the address from said address register and the increment value from said constant generator, wherein said control means commands said address register and said constant generator to store and significant bits corresponding to said bit with of said maximal address and delivers a control signal which inhibits said adder from operating a portion of said adder which is unnecessary for calculation of the significant bits; and wherein said adder has a plurality of bit stages and includes at each bit stage (i) a full adder having a carry output and (ii) a gate circuit for controlling a transfer of the carry output of said full adder to an upper bit stage under control of said control means.

8. A program controller according to claim 7, wherein said gate circuit at each of said plurality of bit stages comprises an AND gate.

9. A program controller comprising:

an instruction memory for storing instructions for a processor;

an installed address width storage for storing a bit width of a maximal address of said instruction memory;

a program counter for supplying to said instruction memory an address of an instruction to be read out of said instruction memory; and control means, connected to said installed address width storage, for inhibiting said program counter from operating a portion of said program counter for bits other than the bit width of the maximal address, wherein a calculation operation only on bits within the bit width of the maximal address is allowed to be executed;

wherein said program counter includes:
an address register for storing said address;
a constant generator for storing an increment value which modifies said address stored in said address register; and
an adder for adding the address from said address register and the increment value from said constant generator, wherein said control means commands said address register and said constant generator to store only significant bits corresponding to said bit width of the maximal address so that said address register and said constant generator store least significant bits corresponding to said significant bits, and values of bits other than said least significant bits are held at zero, said control means delivering a control signal which inhibits said adder from operating a portion of said adder which is unnecessary for operation on the significant bits.

* * * * *